US011666079B2

(12) United States Patent
Schultz et al.

(10) Patent No.: US 11,666,079 B2
(45) Date of Patent: Jun. 6, 2023

(54) COMPOSITION AND METHOD FOR MANUFACTURING CLEAR BEVERAGES COMPRISING NANOEMULSIONS WITH *QUILLAJA SAPONINS*

(71) Applicant: Givaudan S.A., Vernier (CH)

(72) Inventors: Matthias Schultz, Uster (CH); Vivianne Monnier, Schwerzenbach (CH)

(73) Assignee: Givaudan S.A., Vernier (CH)

( * ) Notice: Subject to any disclaimer, the term of this patent is extended or adjusted under 35 U.S.C. 154(b) by 0 days.

(21) Appl. No.: 14/383,645

(22) PCT Filed: Mar. 13, 2013

(86) PCT No.: PCT/EP2013/055113
§ 371 (c)(1),
(2) Date: Sep. 8, 2014

(87) PCT Pub. No.: WO2013/135759
PCT Pub. Date: Sep. 19, 2013

(65) Prior Publication Data
US 2015/0030748 A1 Jan. 29, 2015

(30) Foreign Application Priority Data
Mar. 13, 2012 (GB) ..................... 1204377

(51) Int. Cl.
*A23L 29/10* (2016.01)
*A23L 2/385* (2006.01)
*A23L 2/52* (2006.01)
*A23L 2/39* (2006.01)
*A23L 2/56* (2006.01)
*A23L 29/25* (2016.01)

(52) U.S. Cl.
CPC ............... *A23L 29/10* (2016.08); *A23L 2/385* (2013.01); *A23L 2/39* (2013.01); *A23L 2/52* (2013.01); *A23L 2/56* (2013.01); *A23L 29/25* (2016.08); *A23V 2002/00* (2013.01)

(58) Field of Classification Search
CPC . A23L 29/10; A23L 2/385; A23L 2/39; A23L 2/52; A23L 2/56; A23L 29/25; A23L 2/68; A23L 2/38; A23L 2/70; A23L 27/00; A23V 2002/00
See application file for complete search history.

(56) References Cited

U.S. PATENT DOCUMENTS

| | | | | |
|---|---|---|---|---|
| 5,405,756 A * | 4/1995 | Naito | ..................... | A23L 1/3053 426/590 |
| 8,795,757 B2 | 8/2014 | Schrader et al. | | |
| 2007/0264401 A1 * | 11/2007 | Taormina | ............. | A23L 3/3562 426/532 |
| 2008/0044551 A1 | 2/2008 | Subramaniam | | |
| 2009/0018186 A1 * | 1/2009 | Chen | ....................... | A23L 2/395 514/458 |
| 2009/0317532 A1 * | 12/2009 | Bromley | .................. | A23L 33/12 426/590 |
| 2010/0098821 A1 | 4/2010 | Comstock et al. | | |
| 2011/0020512 A1 | 1/2011 | Masutake et al. | | |
| 2011/0059205 A1 * | 3/2011 | Gaysinsky | ............. | A23G 4/068 426/66 |
| 2011/0236364 A1 * | 9/2011 | Bromley | .................. | A23L 33/12 424/94.1 |
| 2011/0236558 A1 * | 9/2011 | Tran | ........................ | A23L 1/035 426/602 |
| 2012/0251685 A1 * | 10/2012 | Wang-Nolan | ........ | A23D 7/0053 426/250 |
| 2012/0322750 A1 * | 12/2012 | Schrader | .................. | A23L 2/385 514/25 |
| 2013/0004621 A1 * | 1/2013 | Schrader | .................... | A23L 2/52 426/73 |
| 2013/0089644 A1 | 4/2013 | Klingenberg et al. | | |
| 2013/0142909 A1 | 6/2013 | Klingenberg | | |

FOREIGN PATENT DOCUMENTS

| | | |
|---|---|---|
| EP | 2 359 698 A1 | 8/2011 |
| EP | 2 359 702 A1 | 8/2011 |
| EP | 2359702 A1 | 8/2011 |
| EP | 2 601 848 A1 | 6/2013 |
| JP | S 57-186474 A | 11/1982 |
| JP | 63-098369 | * 10/1986 |
| JP | 2004 091392 A | 3/2004 |

(Continued)

OTHER PUBLICATIONS

HUT: Hielscher Ultrasound Technology: Ultrasonic Extraction of Quillaja Saponins, copyright 1999-2020 (Year: 1999).*
Bertera: Publication No. EP 2037765 A1; Publication Date: Mar. 25, 2009. (Year: 2009).*
Rodrigues: Novel Ingredient Solutions for Formulating Clear-Type Beverages; © 2011 National Starch LLC. (Year: 2011).*
PCT/EP2013/055113—International Search Report, dated Jun. 25, 2013.

(Continued)

*Primary Examiner* — Tamra L. Dicus
(74) *Attorney, Agent, or Firm* — Curatolo Sidoti & Trillis Co., LPA; Salvatore A. Sidoti

(57) ABSTRACT

A method of making a clear beverage concentrate, which contains a nanoemulsion of a liquid flavour oil in an aqueous phase, including the emulsification of the flavour oil into water in the presence of an emulsifier, which emulsifier consists of at least 5% by weight *Quillaja* saponins, optionally containing at least one other emulsifier, characterised in that, prior to emulsification, the pH of the aqueous phase is adjusted to 4.0 maximum. The method allows the preparation of beverages that not only are crystal-clear, but which also have substantially more of the full flavour of the original flavour oil.

9 Claims, No Drawings

(56) References Cited

FOREIGN PATENT DOCUMENTS

| | | |
|---|---|---|
| JP | 2006-249037 A | 9/2006 |
| JP | 2007 269714 A | 10/2007 |
| JP | 2008-528680 A | 7/2008 |
| JP | 2010 142205 A | 7/2010 |
| WO | WO 2008/039564 A1 | 4/2008 |
| WO | WO 2011/010368 A1 | 1/2011 |
| WO | WO 2011/089249 A1 | 7/2011 |
| WO | WO 2011/154407 A1 | 12/2011 |

OTHER PUBLICATIONS

PCT/EP2013/055113—International Written Opinion, dated Jun. 25, 2013.
PCT/EP2013/055113—International Preliminary Report on Patentability, dated Sep. 16, 2014.
GB 1204377.4—British Search Report, dated Jun. 25, 2012.
San Martin, et al., Quality Control of Commerical QUILLAJA (Quillaja Saponaria Molina) extracts by reverse phase HPLC, Journal of the Science of Food and Agriculture, 2000, vol. 80, pp. 2063-2068.
Notice of Opposition for corresponding European Patent No. 2 825 060 B1, submitted on Sep. 27, 2018.
Response to Opposition of corresponding European Patent No. 2 825 060 B1, submitted on Feb. 13, 2019.
Opposer's alleged Presentation at Bell Flavors & Fragrances on May 25, 2010.
Opposer's alleged Presentation at an "exhibition" in 2011.
Opposer's alleged Article "Novel Ingredient Solutions for Formulating Clear-Type Beverages", National Starch Food Innovation, allegedly published on Jan. 2012.
Opposer's alleged Flyer entitled "Q-Naturale® 200 emulsifier the Clear Choice for Natural Emulsification", undated, but allegedly published before 2012.
Overview of pH values of organic acids, undated.
Opposer's alleged Presentation at Givaudan on Jul. 13, 2011.
Opposer's alleged Webinar Presentation entitled "The Future of Beverages: Developer solutions for today's five top beverage formulating challenges" held on Oct. 18, 2011.
Declaration of Ricardo Rodriguez, currently employed by the Opposer, dated Sep. 2018.
Bou, et al., "Effect of different antioxidants on lycopene degradation in oil-in-water emulsions", Eur. J. Lipid Sci. Technol., vol. 112, pp. 724-729, 2011.
Winifred M. Cort, "Antioxidant properties of Ascorbic Acid in foods", Advances in Chemistry, vol. 200, Chapter 22, pp. 533-550, Jun. 1, 1982. (Abstract.).
K. Jorge, "Soft Drinks | Chemical Composition—Sorbic Acid", Encyclopedia of Food Sciences and Nutrition (second edition), 2003. (Abstract.).
K. Jorge, "Soft Drinks | Chemical Composition—Benzoic Acid", Encyclopedia of Food Sciences and Nutrition (second edition), 2003. (Abstract.).
Opposer's article entitled "Novel Ingredient Solutions for Removing Weighting Agents", Ingredion, undated.
Notice of Opposition filed against corresponding European Patent 2.825.060 B1 by Opponent Corn Products Development, Inc., dated Sep. 27, 2018.
Statement regarding Grounds for Appeal, filed by Givaudan SA, in corresponding European Patent No. 2.825.060 B1.
Decision by the European Patent Office revoking corresponding European Patent No. 2.825.060 B1, dated Dec. 19, 2019.
Opposer's Written Submissions Document filed against corresponding European Patent No. 2.825.060 B1 by Opponent Corn Products Development, Inc., dated Sep. 27, 2018 in preparation for the Oral Proceedings scheduled to take place on Nov. 29, 2019.
Bell Flavors & Fragrances, National Starch Food Innovation at Bell Flavors & Fragrances, Presentation dated May 25, 2010.
Corn Products International, Overcoming the challenges of stabilising natural colours in beverages through the use of Quillaia extract, Presentation dated 2011.
Ricardo Rodriquez, Novel Ingredient Solutions for Formulating Clear-Type Beverages, National Starch Food Innovation, dated 2011.
Trina O'Brien, News Release: National Starch/Corn Products Publishes White Paper on Ingredient Solutions for Formulating Clear-Type Beverages, Corn Products International, National Starch Food Innovation, dated Jan. 30, 2012.
Q-Naturale 200 emulsifier The Clear Choice for natural emulsification, Corn Products International, National Starch Food Innovation.
Our History, Innovators then, now and for the future, Ingredion.
PH of Organic Acids—Sorted by Molecular Formula, available at http://www.aqion.de/site/192.
Presentation entitled: Givaudan Visit Jul. 13, 2011, National Starch.
Ricardo Rodriguez and Dinah Diaz, The Future of Beverages: Developer solutions for today's give top beverage formulating challenges, Corn Products International, National Starch, Webinar held on Oct. 18, 2011.
Advertisement for Webinar entitled: The Future of Beverages: Solutions for the Top Five Beverages Formulation Challenges, Beverage Industry, Webinar held on Oct. 18, 2011.
Email from Dinah Diaz dated Oct. 28, 2011, Updated: Q Naturale Marketing Campaign.
Statement of Ricardo Rodriguez, dated Sep. 26, 2018.
Way-Back Machine snip dated Sep. 25, 2011 regarding the Webinar referred to in "Statement of Ricardo Rodriguez."
Way-Back Machine snip dated Nov. 14, 2011 regarding the Webinar referred to in "Statement of Ricardo Rodriguez."
Ricard Bou, et al., Effect of different antioxidants on lycopene degradation in oil-in-water emulsions, European Journal of Lipid Science and Technology, 2011, pp. 724-729, vol. 113, Wiley-VCH, Germany.
Winifred M. Cort, Antioxidant Properties of Ascorbic Acid in Foods, Ascorbic Acid: Chemistry, Metabolism, and Uses, Advances in Chemistry, Jun. 1, 1982, pp. 533-550, vol. 200.
Sorbic Acid, Elsevier-Science Direct, 2018.
Benzoic Acid, Elsevier-Science Direct, 2018.
Afaf Makarious, Novel Ingredient Solutions for Removing Weighting Agents, Ingredion, 2013.
Quyen Nguyen, Experimental Report, Ingredion, dated Jul. 29, 2019.
Oreste Arrigoni and Mario C. De Tullio, Ascorbic acid: much more than just an antioxidant, Biochimica et Phiophysica Acta, 2002, pp. 1-9, vol. 1569, Elsevier Science B.V.
Maret G. Traber and Jeffrey Atkinson, Vitamin E, antioxidant and nothing more, Free Radical Biology & Medicine, 2007, pp. 4-15, vol. 43, Elsevier Science Direct.
F. Shahidi, Antioxidants in food and food antioxidants, Nahrung, 2000, p. 158, vol. 44, Wiley-VCH Verlag GmbH, Germany.
J. N. Sofos and F.F. Busta, Antimicrobial Activity of Sorbate, Journal of Food Protection, Aug. 1981, pp. 614-622, vol. 44, No. 8.
P. Michael Davidson, Antimicrobials in Food (Third Edition), Food Science and Technology, 2005, Taylor & Francis Group, Boca Raton, Florida.
Lotioncrafter, Potassium Sorbate.
P.R. Ashurst, Food Flavourings (Second Edition), 1991, Blackie and Son Ltd.
Turbidity, Ultrafilter: The Filtration Manufacturer.
Turbidity—Ambiguity of a Liquid, Ultrafilter: The Filtration Manufacturer.
Acidity Regulators, Acidulants, Product List.
E.W. Hammond, Vegetable Oils: Types and Properties, Encyclopedia of Food Sciences and Nutrition (Second Edition), 2003.
Office Action dated Jan. 26, 2017, for Japanese patent application No. 2014-561432.
Office Action dated Sep. 26, 2017, for Japanese patent application No. 2014-561432.

\* cited by examiner

COMPOSITION AND METHOD FOR MANUFACTURING CLEAR BEVERAGES COMPRISING NANOEMULSIONS WITH QUILLAJA SAPONINS

CROSS REFERENCE TO RELATED APPLICATIONS

This application is a national stage application of International Application No. PCT/EP2013/055113, filed 13 Mar. 2013, which claims priority from Great Britain Patent Application No. 1204377.4, filed 13 Mar. 2012, from which applications priority is claimed, and which are incorporated herein by reference.

This disclosure relates to clear beverages and to methods of preparing them.

Clear beverages, particularly those with fruit flavours, require that the flavour be in the form of a nanoemulsion, that is, an emulsion of such small particle size that it gives rise to no discernible turbidity. The particle size of such an emulsion is smaller than the wavelength of visible light, that is, having a maximum diameter of about 150 nm, ideally less than 100 nm.

Emulsifiers are naturally required to make such emulsions, and, as the products are consumables, they must comply with Government regulations concerning such products. Thus, the desire is to use natural emulsifiers. Some traditional emulsifiers of this kind have included gum arabic gum ghatti, gum tragacanth, fenugreek gum, mesquite gum, and sugar beet pectin. These permit the attainment of a minimum particle size of about 200 nm. Thus, a beverage prepared using an emulsion based on gum will have a turbidity of about 200-400 NTU (i.e., Nephelometric Turbidity Unit, a unit of turbidity well-known to and widely used by the art and measured, for example, by a Hach 2100N turbidimeter (ex Hach Company), using the instrument as per the instructions). At this level, some turbidity is still noticeable, and the "crystal-clear" desideratum is not achieved or achievable by this method.

More recently, it has been found and disclosed, for example, in Japanese published application 2010-142205, that certain *Quillaja* extracts could help provide an emulsifier that could result in nanoemulsions and clear beverages. *Quillaja* extract is an extract obtained from a number of trees of the *Quillaja* species (family *Quillajaceae*) native to the Americas. One such tree is *Quillaja saponaria* Molina, a native of Chile. The extracts are commercially available and are rich sources of saponins (a typical extract will contain about 14% saponins by weight). These extracts are known to be natural foaming agents in a number of applications, including foods and beverages (see, for example, San Martin and Briones in *J. Sci. Food Agric* 80:2063-2068 (2000)). They are frequently sold in admixture with other, cheaper saponin sources, such as *Yucca schidigera* and *Saponaria officinalis*. *Quillaja* saponins are also commercially available as dried extracts, i.e. a water soluble solid powder with saponin contents of 50% or more.

There has understandingly arisen considerable interest in the *Quillaja* saponins as emulsifiers, in conjunction with other materials. For example, Japanese Publication 2010-142205 mentioned hereinabove describes the use of *Quillaja* extract with a polyoxyethylene sorbitan fatty acid ester. Other examples are PCT published application WO 2011/089249, which describes the use of *Quillaja* saponins, plus a substantial proportion of lechitin, as an emulsifier for clear beverages, and EP 2 359 702, which describes the use of *Quillaja* saponins in combination with polymeric emulsifiers for the emulsification of solid, sparingly water-soluble polyphenols, flavonoids and diterpenoid glucosides.

It has now surprisingly been found that it is possible more effectively to provide a crystal-clear beverage flavoured with a liquid flavour oil, without the need for additional emulsifiers. This disclosure therefore provides a method of making a clear beverage concentrate, which comprises a nanoemulsion of a liquid flavour oil in an aqueous phase, comprising the emulsification of the flavour oil into water in the presence of an emulsifier, which emulsifier consists of at least 5% by weight *Quillaja* saponins, optionally containing at least one other emulsifier, characterised in that, prior to emulsification, the pH of the aqueous phase is adjusted to 4.0 maximum.

The use of this method allows the maintenance of full authenticity of the flavour profile. This is because the method can be used with the original flavour, as opposed to the "washed" flavour commonly used in the art. By "washed flavour" is meant a flavour from which most or even all of the water-insoluble matter (such as monoterpenes) has been removed. While such a "wash" retains the basic flavour, it is lacking in many of the other attributes of the original, such as the "peely", body, full, round flavour notes of the original. The flavour concentrates of this disclosure retain all of these, and thus provide a more authentic flavour.

The emulsifier consists of at least 5% by weight *Quillaja* saponins. These are commercially available as extracts, for example, the Q-Naturale™ range of products from National Starch, such extracts containing typically 14% by weight saponins. Although it is possible to isolate the *Quillaja* saponins, this is expensive, and in practice it is more usual to use the extract itself, the quantity of extract used being selected to provide the desired proportion of *Quillaja* saponins.

In particular embodiments, the emulsifier consists of 25, 50, 75 and 100% *Quillaja* saponins.

In those cases where other emulsifiers are used, these may be present to the extent of 95% by weight maximum of the total emulsifier. However, as explained above, they may be selected from those emulsifiers known to and used by the art. Non-limiting examples of these include polysorbates, sucrose esters and polyglycerol esters of fatty acids and lecithin. More than one such non-*Quillaja* emulsifier may be used.

The proportion of *Quillaja* saponins (and therefore extract) necessary will vary from application to application, and a skilled person can readily determine an appropriate amount with only simple experimentation. As a general guide, the weight ratio of *Quillaja* saponins to flavour base is of the order of from 0.1-3.0. Although the addition of saponins outside this ratio often has no effect (for example, above 3, the bitter taste of saponins may become noticeable), there might well be particular systems and uses in which ratios outside this range might be useful, and, although the best results are generally obtained with ratios inside the range, they should not be considered absolute limits.

The pH adjustment, which is carried out prior to emulsification, may be achieved by the addition of acid. The acid used may be any food-approved acid, that is, any acid whose use in food and beverages is officially approved. Thus, there can be used not only the usual organic acids, such as citric, malic, acetic and lactic acids, but also such inorganic acids as phosphoric, as used in some cola beverages.

In a typical non-limiting example, the addition of a flavour concentrate according to this disclosure containing 5% by weight of *Quillaja* extract, which extract contains 14% saponins (i.e., 0.7% saponins in the concentrate) with 3% of an orange flavour base to a beverage base adjusted to the appropriate pH (typically water, sucrose or other sweeteners, citric acid and preservatives, sometimes vitamins and other ingredients) will give a clear orange beverage that has a turbidity of less than 10 NTU, i.e., is transparent.

Increasing the *Quillaja* extract to 7.5% improves the NTU value only slightly, and in a way that is barely perceptible to the naked eye.

In order to produce a concentrate, it is necessary to subject a blend of a flavour material, water and *Quillaja* extract to high shear blending, such that the desired nanoemulsion particle size is achieved. This is achieved by high pressure homogenisation. This is a technique well known to and frequently used by the art, and the equipment is readily available. In a particular embodiment, the blend of flavour material, water and extract are first subjected to a high shear pre-homogenisation step, and then to sufficient passes on a high pressure homogeniser to achieve the desired result. The pre-homogenisation may typically be carried out using a rotor-stator mixer or a Waring blender. The resulting concentrate has typically from 1-10%, particularly from 2-5%, by weight of flavour material.

It is not possible to produce a nanoemulsion of the desired particle size in a single homogenisation step on standard emulsification equipment, and it is always necessary to carry out the homogenisation several times, or, in the terminology of the art, to make more than one "pass". For commercialisation purposes, the fewer passes, the better, and large numbers of passes are completely unacceptable. It has been found that some modifications to the process hereinabove described can reduce the number of passes significantly. In some cases, only three passes are necessary to produce a clear nanoemulsion.

In a first modification, at least one monosaccharide or disaccharide sugar may be added to the concentrate. Typical examples include glucose, fructose and sucrose. Sucrose is known from WO 2008/039564 to be useful in combination with sucrose monoesters, but it is surprising that such sugars used alone should have any effect on *Quillaja* extracts. Addition of such sugars (which can be a single sugar or a mixture of two or more such sugars) enables the attainment of a desired nanoemulsion size with a reduced number of passes. The sugars are typically added at a concentration of from 10-50 wt % of the nanoemulsion.

In a second modification, certain solvents may be added to the concentrate. These are selected from propylene glycol (PG) and glycerol. These are well-known beverage solvents, but again it is surprising that their use can have such an effect in the reduction of the number of passes. They may be used typically at a concentration of from 10-95% of the nanoemulsion.

In a particular embodiment, a combination of at least two of PG, glycerol and sucrose produces particularly beneficial effects. It is possible to use PG-sucrose, glycerol-sucrose, PG-glycerol and all three together. A typical example is PG-glycerol at 10%-25%. Further particular examples are PG-glycerol-sucrose at 40-24-27 and 10-25-35.

In a third modification, standard homogenisation equipment with typical pressures up to 50 MPa is be replaced by homogenisation equipment which enables the application of higher pressures (in excess of 100 MPa and up to several hundred MPa). Such equipment is well known, but is not generally used in the beverage flavour industry because the high pressures have not been regarded as necessary or useful—indeed in some circumstances they may be disadvantageous (they can damage gum arabic or modified starch). Examples of such equipment include the Microfluidizer™ (Microfluidics Corp.) and the EmulsiFlex™ (Avestin).

There is thus provided a flavoured clear beverage concentrate, preparable by a method as hereinabove described.

A clear beverage is prepared by blending the concentrate thus prepared with a clear beverage base, i.e., a composition containing any of the standard ingredients known to the art in art-recognised proportions, other than the concentrate. Typically, the flavour concentration in the consumable product will be in the range of from 0.0005-0.05%, particularly from 0.001-0.02%, by weight of the consumable product. The final product is a completely transparent consumable product with a full flavour.

In a further embodiment, the concentrate hereinabove described may be converted to solid form. In this form, it is storage-stable, and can be used to produce a clear consumable product, simply by dissolving it in water or in a consumer product base containing any of the standard ingredients known to the art in art-recognised proportions. The process may be performed by adding to the concentrate an aqueous solution of a carrier and then spray-drying the resultant mixture. The result is a non-sticky powder, which can be used in this form or, if desired, compounded into tablet form, with other art-recognised ingredients. The solution of the solid form results in a completely transparent consumable product with a full flavour.

Carriers are well known in the field of spray drying, but not all are suitable for use in connection with this system. It has been found that high MW gum arabic is particularly suitable.

The disclosure therefore further provides a solid-form clear beverage product concentrate, preparable by taking a concentrate as hereinabove described and processing it as hereinabove described.

The process is further described with reference to the following non-limiting examples.

COMPARATIVE EXAMPLE 1

A nanoemulsion (Comparative Example 1) with a composition given in Table 1 was prepared by blending deionised water, propylene glycol, glycerine and sugar syrup until homogeneous. *Quillaja* extract was added and the blend was again stirred until homogeneous. Under high shear using a Polytron PT6100 system equipped with a PT-DA 3030-6060 dispersing aggregate the Orange flavour base was added to the water phase. High shear blending was continued at 18000 rpm for 5 minutes. The resulting coarse emulsion was processed through an APV60 high pressure homogeniser at 400/50 bars (5600/700 psi) 3 times. The hydrodynamic diameter was determined on a Zetasizer HSA (Malvern Instruments) using the instrument as per the instructions. Values given are averages of three measurements.

pH of the emulsion: 4.8 hydrodynamic diameter after three homogenisation passes: 134 nm

TABLE 1

| Ingredient Name | Comparative Example 1 g/kg |
|---|---|
| Deionised water | 27.5 |
| Propylene glycol | 150.0 |
| Glycerine 99.5% | 200.0 |

TABLE 1-continued

| Ingredient Name | Comparative Example 1 g/kg |
|---|---|
| Quillaja extract* | 50.0 |
| Sugar syrup 65Brix | 538.5 |
| Orange flavour base** | 34.0 |

*Q-Naturale ™ 200 (National Starch Food Innovation)
**Product code 96584505 (Givaudan)

Examples 1-4

Nanoemulsions were prepared according to the process described for Comparative Example 1 with the only difference that the amount of citric acid given in Table 2 was first dissolved in deionised water before solvents and sugar syrup were added. The amount of acid added is subtracted from the amount of water given in Comparative Example 1. pH values and hydrodynamic diameters are given in Table 2. All hydrodynamic diameters are significantly lower than that in Comparative Example 1 without acid added before homogenisation. The lower the pH, the smaller is the size of the nanoemulsion droplets.

TABLE 2

| Example | Amount of citric acid added (g/kg emulsion) | pH | Hydrodynamic diameter (nm) |
|---|---|---|---|
| 1 | 1.65 | 3.8 | 111 |
| 2 | 4.00 | 3.2 | 109 |
| 3 | 6.34 | 2.9 | 105 |
| 4 | 12.00 | 2.6 | 100 |

Examples 5-12

Nanoemulsions were prepared according to the process described for Comparative Example 1 with the only difference that the amount of organic acids given in Table 3 was first dissolved in deionised water before solvents and sugar syrup were added. The amount of acid added is subtracted from the amount of water given in Comparative Example 1. pH values and hydrodynamic diameters are given in Table 3. All hydrodynamic diameters are significantly lower than that in Comparative Example 1 without acid added before homogenisation. The stronger the acid, the smaller the amount of acid needed to achieve a particular pH.

TABLE 3

| Example | Acid used | Amount of acid added (g/kg emulsion) | pH | Hydrodynamic diameter (nm) |
|---|---|---|---|---|
| 5 | Ascorbic acid | 12.00 | 3.6 | 110 |
| 6 | Tartaric acid | 1.65 | 3.4 | 112 |
| 7 | Tartaric acid | 4.00 | 2.9 | 105 |
| 8 | Tartaric acid | 6.34 | 2.7 | 103 |
| 9 | Malic acid | 1.65 | 3.6 | 119 |
| 10 | Malic acid | 4.00 | 3.2 | 110 |
| 11 | Malic acid | 8.00 | 3.0 | 103 |
| 12 | Malic acid | 12.00 | 2.8 | 100 |

Example 13

A nanoemulsion was prepared according to the process described for Comparative Example 1 with the only difference that the amount of phosphoric acid given in Table 4 was first dissolved in deionised water before solvents and sugar syrup were added. The amount of acid added is subtracted from the amount of water given in Comparative Example 1. pH value and hydrodynamic diameter after three passes of high pressure homogenisation are given in Table 4. The hydrodynamic diameter is significantly lower than that in Comparative Example 1 without acid added before homogenisation.

TABLE 4

| Example | Amount of acid added (g/kg emulsion) | pH | Hydrodynamic diameter (nm) |
|---|---|---|---|
| 13 | 1.5 | 3.0 | 110 |

Comparative Examples 2-3 and Examples 14-16

Nanoemulsions comparable to those described above were prepared using a different Orange and a Lemon flavour base. Table 5 displays flavour base, amounts of citric acid added and hydrodynamic diameters after three homogenisaton passes.

TABLE 5

| Example | Flavour base | Amount of acid added (g/kg emulsion) | Hydrodynamic diameter (nm) |
|---|---|---|---|
| CE2 | Orange* | | 142 |
| 14 | Orange* | 3.00 (plus 1.50 sodium benzoate) | 117 |
| 15 | Orange* | 1.65 | 118 |
| CE3 | Lemon** | | 148 |
| 16 | Lemon** | 1.65 | 122 |

*Product Code 96584506 (Givaudan)
**Product Code 96584510 (Givaudan)

Comparative Example 4 and Example 17 (same as Example 1)

A nanoemulsion (Comparative Example 4) was prepared according to the process described for Comparative Example 1. However, amounts of water, solvents and *Quillaja* extract were changed to allow dissolution of an additional emulsifier (gum arabic) in the water phase before homogenisation. The ratio of *Quillaja* extract and gum arabic was chosen according to examples disclosed in EP 2359702 to show that the combination with an emulsifying polymer as in EP 2359702 does not work to achieve sufficiently low diameters. For comparison, the compositions of Comparative Example 4 and Example 1 are given in Table 6 together with hydrodynamic diameters measured after one, two and three passes through a high pressure homogeniser. The combination of *Quillaja* extract and gum arabic results in significantly larger droplet diameters than in Comparative Example 1 (without acid) and in Example 1 (with acid) even in the presence of citric acid. It was further found that after two passes of high pressure homogenization the hydrodynamic diameter is not further reduced.

TABLE 6

| Ingredient Name | Comparative Example 4 (g/kg) | Example 1 (g/kg) |
|---|---|---|
| Deionised water | 55.20 | 25.85 |
| Citric acid | 1.65 | 1.65 |
| Gum Arabic* | 36.80 | |
| Propylene glycol | 100.00 | 150.00 |
| Glycerine 99.5% | 193.85 | 200.00 |
| Quillaja extract** | 40.00 | 50.00 |
| Sugar syrup 65Brix | 538.50 | 538.50 |
| Orange flavour base*** | 34.00 | 34.00 |
| Hydrodynamic diameter (nm) | | |
| After 1 pass | 184 | 147 |
| After 2 passes | 163 | 119 |
| After 3 passes | 170 | 111 |

*Gum Arabic Instant AA (CNI)
**Q-Naturale ™ 200 (National Starch Food Innovation)
***Product Code 96584505 (Givaudan)

The invention claimed is:

1. A method of making a clear beverage concentrate, which comprises a nanoemulsion of a liquid flavor oil in an aqueous phase, comprising:
   adjusting the pH of the aqueous phase to 4.0 maximum prior to emulsification of the liquid flavor oil into the aqueous phase; and
   emulsifying the flavor oil into the aqueous phase in the presence of an emulsifier, wherein the emulsifier is at least 5% by weight *Quillaja* saponins,
   wherein the weight ratio of the *Quillaja* saponins to the liquid flavor oil is about 0.1 to about 3.0,
   wherein the nanoemulsion comprises particles with a hydrodynamic diameter in the range of 100 nm to 122 nm, and
   optionally containing at least one other emulsifier.

2. The method according to claim 1, in which the pH is adjusted by addition of food-approved acid.

3. The method according to claim 2, wherein the food approved acid is selected from the group consisting of citric acid, malic acid, acetic acid, lactic acid, ascorbic acid, tartaric acid, phosphoric acid and combinations thereof.

4. The method according to claim 1, in which the proportion of *Quillaja* a saponins in the emulsifier is 25% by weight.

5. A method of making a solid-form clear beverage concentrate, comprising adding a carrier to the concentrate according to claim 1 and spray-drying, the carrier comprising gum Arabic of molecular weight greater than 100 kDa.

6. A solid-form clear beverage concentrate, prepared by the method according to claim 5.

7. The method according to claim 1, in which the proportion of *Quillaja* saponins in the emulsifier is 50% by weight.

8. The method according to claim 1, in which the proportion of *Quillaja* saponins in the emulsifier is 75% by weight.

9. The method according to claim 1, in which the proportion of *Quillaja* saponins in the emulsifier is 100% by weight.

* * * * *